(12) United States Patent
Gentile

(10) Patent No.: US 8,727,918 B1
(45) Date of Patent: May 20, 2014

(54) ILLUMINATED GAME PROJECTILE WITH CRADLED LIGHT SOURCE

(76) Inventor: Robert Gentile, Billerica, MA (US)

(*) Notice: Subject to any disclaimer, the term of this patent is extended or adjusted under 35 U.S.C. 154(b) by 0 days.

(21) Appl. No.: 13/550,489

(22) Filed: Jul. 16, 2012

Related U.S. Application Data

(60) Provisional application No. 61/507,683, filed on Jul. 14, 2011.

(51) Int. Cl.
*A63B 43/06* (2006.01)

(52) U.S. Cl.
USPC ............................................ 473/570; 473/588

(58) Field of Classification Search
USPC .................................. 473/570, 588, 589, 569
See application file for complete search history.

(56) References Cited

U.S. PATENT DOCUMENTS

| | | | |
|---|---|---|---|
| 2,020,484 A | 11/1935 | Turner | |
| 3,102,727 A * | 9/1963 | Rice ............................. | 473/570 |
| 3,458,205 A * | 7/1969 | Douglas et al. ............... | 473/199 |
| 3,580,575 A | 5/1971 | Speeth | |
| 3,804,411 A * | 4/1974 | Hendry ........................ | 473/570 |
| 4,183,536 A * | 1/1980 | Platt ............................ | 473/570 |
| 4,776,589 A | 10/1988 | Yang | |
| 4,846,475 A * | 7/1989 | Newcomb et al. ............ | 473/570 |
| 4,968,036 A * | 11/1990 | Von Der Mark .............. | 473/570 |
| 5,007,647 A | 4/1991 | Gulick | |
| 5,066,011 A * | 11/1991 | Dykstra et al. ................ | 473/570 |
| 5,102,131 A | 4/1992 | Remington | |
| 5,186,458 A * | 2/1993 | Redondo ...................... | 473/570 |
| 5,228,686 A | 7/1993 | Maleyko | |
| 5,236,383 A | 8/1993 | Connelly | |
| 5,330,195 A | 7/1994 | Gulick et al. | |
| 5,388,825 A | 2/1995 | Myers et al. | |
| 5,490,047 A | 2/1996 | O'Rourke et al. | |
| 5,564,702 A | 10/1996 | Meffert | |
| 5,639,076 A | 6/1997 | Cmiel | |
| 5,722,906 A | 3/1998 | Gentile | |
| 5,725,445 A | 3/1998 | Kennedy et al. | |
| 5,924,942 A | 7/1999 | Gentile | |
| 6,042,487 A | 3/2000 | Schrimmer et al. | |
| 6,117,030 A * | 9/2000 | Green, Sr. .................... | 473/570 |
| 6,126,561 A * | 10/2000 | Mark ........................... | 473/588 |
| 6,142,894 A | 11/2000 | Lee | |
| 6,257,995 B1 | 7/2001 | Schrimmer et al. | |
| 6,322,465 B1 | 11/2001 | Gentile | |
| 6,428,432 B1 * | 8/2002 | Kachel ......................... | 473/570 |
| 6,464,602 B1 | 10/2002 | Rottger | |
| 6,712,487 B2 * | 3/2004 | Liou ............................ | 362/253 |
| 7,140,972 B2 | 11/2006 | Redwine et al. | |
| 7,614,959 B1 | 11/2009 | Gentile | |
| 7,621,833 B2 * | 11/2009 | Proulx et al. ................. | 473/588 |

(Continued)

*Primary Examiner* — Raleigh W Chiu
(74) *Attorney, Agent, or Firm* — O'Connell Law Firm; Thomas P. O'Connell

(57) ABSTRACT

An illuminated game projectile with a cradled light source with an outer shell, a light source structure disposed within an open inner volume of the outer shell, and a cradle structure disposed within the open inner volume of the outer shell to retain the inner light source structure in a predetermined position. The outer shell can be spherical or puck or otherwise shaped. The cradle structure can be formed by walls disposed in a general X-shape relative to each hemispherical half of the outer shell to encircle the light source structure substantially entirely and retain the light source structure in a position substantially concentric with the outer shell. Where the outer shell is disk shaped, the cradle structure can be formed by a plurality of radially communicating cradling fins.

10 Claims, 8 Drawing Sheets

(56) References Cited

U.S. PATENT DOCUMENTS

| | | |
|---|---|---|
| 7,785,215 B2 | 8/2010 | Kohnen, II |
| 7,867,115 B2 * | 1/2011 | Zawitz ............................ 473/570 |
| 2001/0049311 A1 * | 12/2001 | Lewis et al. ................... 473/570 |
| 2002/0173378 A1 | 11/2002 | Tinsman |
| 2004/0220001 A1 * | 11/2004 | Oister et al. .................. 473/570 |
| 2005/0005873 A1 | 1/2005 | Gick |
| 2007/0087861 A1 * | 4/2007 | Liao et al. ...................... 473/353 |
| 2007/0173349 A1 * | 7/2007 | Eng et al. ....................... 473/353 |
| 2007/0275801 A1 * | 11/2007 | Proulx et al. .................. 473/588 |
| 2007/0281811 A1 * | 12/2007 | Wang ............................. 473/570 |
| 2008/0108454 A1 * | 5/2008 | Kohnen ......................... 473/351 |
| 2009/0040761 A1 * | 2/2009 | Huang et al. .................. 362/253 |
| 2011/0244981 A1 | 10/2011 | Schrimmer et al. |

* cited by examiner

ILLUMINATED GAME PROJECTILE WITH CRADLED LIGHT SOURCE

FIELD OF THE INVENTION

The present invention relates generally to toy and game projectiles. More particularly, disclosed herein is an illuminated game projectile with a light source concentrically retained within an outer shell by a cradle.

BACKGROUND OF THE INVENTION

The prior art has disclosed innumerable game projectile constructions with a nearly endless variety of purposes and effects. However, one knowledgeable in the art will be well aware that there remains a need for an illuminated game projectile that retains a light source in a concentric disposition relative to an outer shell in a structurally efficient manner.

SUMMARY OF THE INVENTION

Advantageously, the present invention is founded on the most basic object of providing an illuminated game projectile that retains a light source in a concentric disposition relative to an outer shell that is structurally efficient in construction.

A further object of embodiments of the invention is to provide an illuminated game projectile that retains a light source in a concentric disposition relative to an outer shell that resists displacement of the light source even in response to impacts on the game projectile.

A related object of the invention is to provide an illuminated game projectile that is capable of withstanding high impacts while maintaining its structural integrity and while demonstrating consistent performance even after successive impacts relative to the game projectile.

A further object of particular embodiments of the invention is to provide a game projectile wherein illumination is triggered in response to an impact relative to the game projectile.

Still another object of embodiments of the invention is to provide a game projectile that can be illuminated by a pressing on the game projectile.

These, and in all likelihood further, objects and advantages of the present invention will become obvious not only to one who reviews the present specification and drawings but also to those who have an opportunity to make use of an embodiment of the illuminated game projectile disclosed herein. However, it will be appreciated that, while the accomplishment of each of the foregoing objects in a single embodiment of the invention may be possible and indeed preferred, not all embodiments will seek or need to accomplish each and every potential advantage and function. Nonetheless, all such embodiments should be considered within the scope of the present invention.

An embodiment of the illuminated game projectile with a cradled light source is founded on an outer shell with an outer surface, an inner surface, and an open inner volume. A light source structure, which can comprise a light source, a power source, and an actuation mechanism, is disposed within the open inner volume of the outer shell. A cradle structure is disposed within the open inner volume of the outer shell to retain the inner light source structure in a predetermined position within the outer shell. The cradle structure has an outer portion that engages the outer shell and an inner portion that engages and retains the light source structure. The cradle structure will preferably retain the light source structure spaced from the inner surface of the outer shell.

In certain embodiments, the outer shell can be spherical, and the light source structure can further comprise a casing comprising a spherical ball. The cradle structure can retain the light source structure in a position substantially concentric with the outer shell. In one such example of the invention, the outer shell can be formed by first and second hemispherical halves with the first hemispherical half having a circular face with a male ridge and the second hemispherical shell having a circular face with a female channel for receiving the male ridge.

The actuation mechanism comprises could take the form of an impact activated switch, and the power source can be rechargeable. Recharging could be achieved, for example, by wireless electricity transfer, by a conductive probe, or by some other mechanism.

The cradle structure can take the form of a wall structure interposed between the inner surface of the outer shell and the outer surface of the light source structure. For example, where the outer shell is spherical with first and second hemispherical halves, the wall structure comprising the cradle structure can comprise walls disposed in a general X-shape relative to each hemispherical half, and the walls can be interposed between the inner surface of the outer shell and the outer surface of the light source structure. The walls of the cradle structure can be retained by the outer shell, such as by being integrally formed therewith as by being molded together therewith.

The walls of the cradle structure can cooperate to encircle the light source structure substantially entirely. Where the outer shell is spherical with first and second hemispherical halves, the wall structure comprising the cradle structure can comprise walls disposed to encircle and retain the light source structure in a position substantially concentric with the outer shell. The walls of the cradle structures can be of a substantially consistent height approximately equal to one-half of the difference between an inner diameter of the outer sphere and an outer diameter of the light source structure. Under such a construction, the walls of the cradle structure have inner surfaces along a spherical shape generally equal in diameter to the outer diameter of the casing of the light source structure.

In other embodiments, the outer shell can have a hockey puck disk shape. As such, it can have an annular outer peripheral wall and first and second faces retained in spaced relation by the peripheral wall. The cradle structure can be formed by a plurality of radially communicating cradling fins with distal ends adjacent to the peripheral wall and proximal portions that retain the inner light source structure. In certain such embodiments, each of the cradling fins can have a shoulder formed at the inner end thereof such that the proximal portion of each retaining fin has a first, outer upstanding portion, a radially communicating shoulder portion, and a second, inner upstanding portion. The second upstanding portions at the proximal ends of the cradling fins can terminate short of a center of the outer shell such that a light source receiving volume is provided between the proximal ends of the several retaining fins. The actuation mechanism can be an impact activated switch and, additionally or alternatively, a press switch operable by pressing on one of the faces of the outer shell.

One will appreciate that the foregoing discussion broadly outlines the more important goals and features of the invention to enable a better understanding of the detailed description that follows and to instill a better appreciation of the inventor's contribution to the art. Before any particular embodiment or aspect thereof is explained in detail, it must be made clear that the following details of construction and illustrations of inventive concepts are mere examples of the many possible manifestations of the invention.

DETAILED DESCRIPTION OF PREFERRED EMBODIMENTS

As is the case with many inventions, the present invention for an illuminated game projectile with a cradled light source is subject to a wide variety of embodiments. However, to ensure that one skilled in the art will be able to understand and, in appropriate cases, practice the present invention, certain preferred embodiments and aspects of preferred embodiments of the broader invention revealed herein are described below and shown in accompanying figures.

Figure 1:
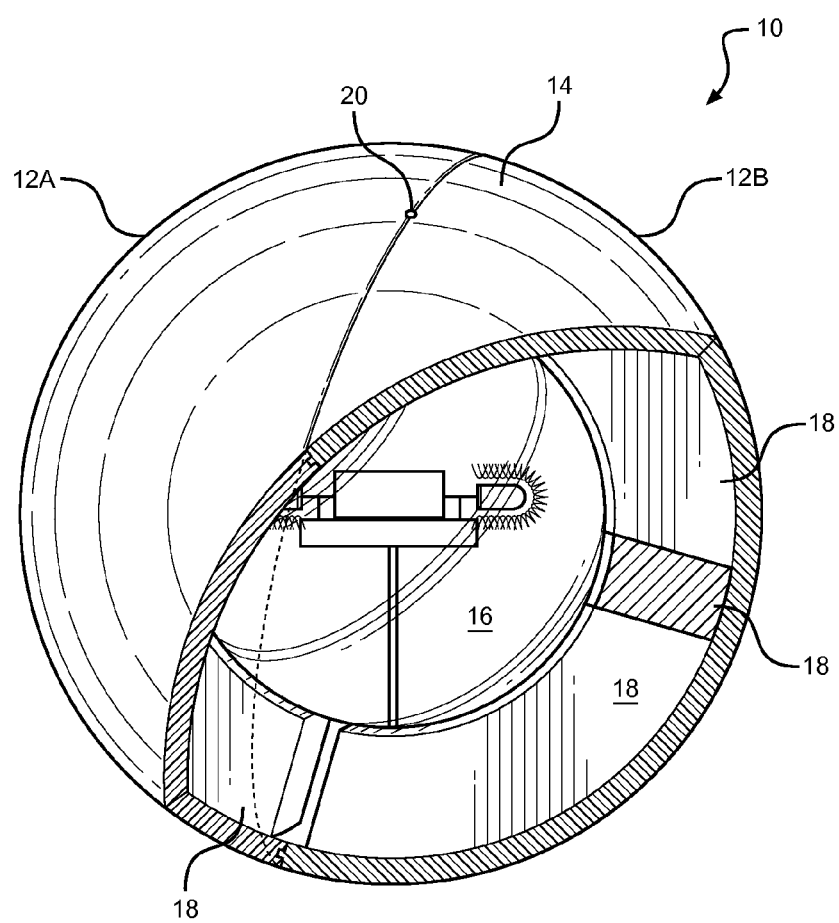
FIG. 1 is a partially sectioned perspective view of an illuminated game projectile in the form of a ball according to the present invention.

Turning more particularly to the drawings, an embodiment of the illuminated game projectile according to the present invention is indicated generally at 10 in FIG. 1. There, the game projectile 10 takes the form of a spherical ball. The illuminated ball 10 can be considered to be founded on a hollow sphere 14 formed by first and second hemispherical halves 12A and 12B to form an outer shell with an open inner volume. Within the sphere 14 is a smaller sphere 16 that is concentrically retained relative to the outer sphere 14 by cradles 18 in each half 12A and 12B as seen more clearly in FIGS. 2 and 3.

The smaller sphere 16 acts as a light source for emitting a flashing or other type of light on impact or other actuation. The smaller sphere 16 is founded on a solid translucent or transparent ball 25 that encases an impact activated switch and microcontroller 26, a battery 28, first and second LED's 30 and 32, and electrical connections 34. A through-hole 22 enables regenerating power to be transmitted to the battery 28 by use of an electrically-conductive member 24 shown in FIG. 3. Alternatively or additionally, the battery 28 could be recharged by any other effective means, such as a wireless charging mat. The outer sphere 14 formed by the first and second halves 12A and 12B has an aperture 20 therein for receiving the electrically-conductive member 24 therethrough for establishing electrical contact with the battery 28, whether directly or through an electrical connection.

As shown in FIG. 1, the first and second halves 12A and 12B are connected by any effective method, such as by sonic welding or any other means. The first half 12A has a male ridge 36 that engages a female channel 38 in the second half 12B for providing an improved coupling of the halves 12A and 12B. The first and second halves 12A and 12B are shown separated in FIG. 2 thereby permitting a clear perception of the ridge and channel combination 36, 38.

Figure 2:
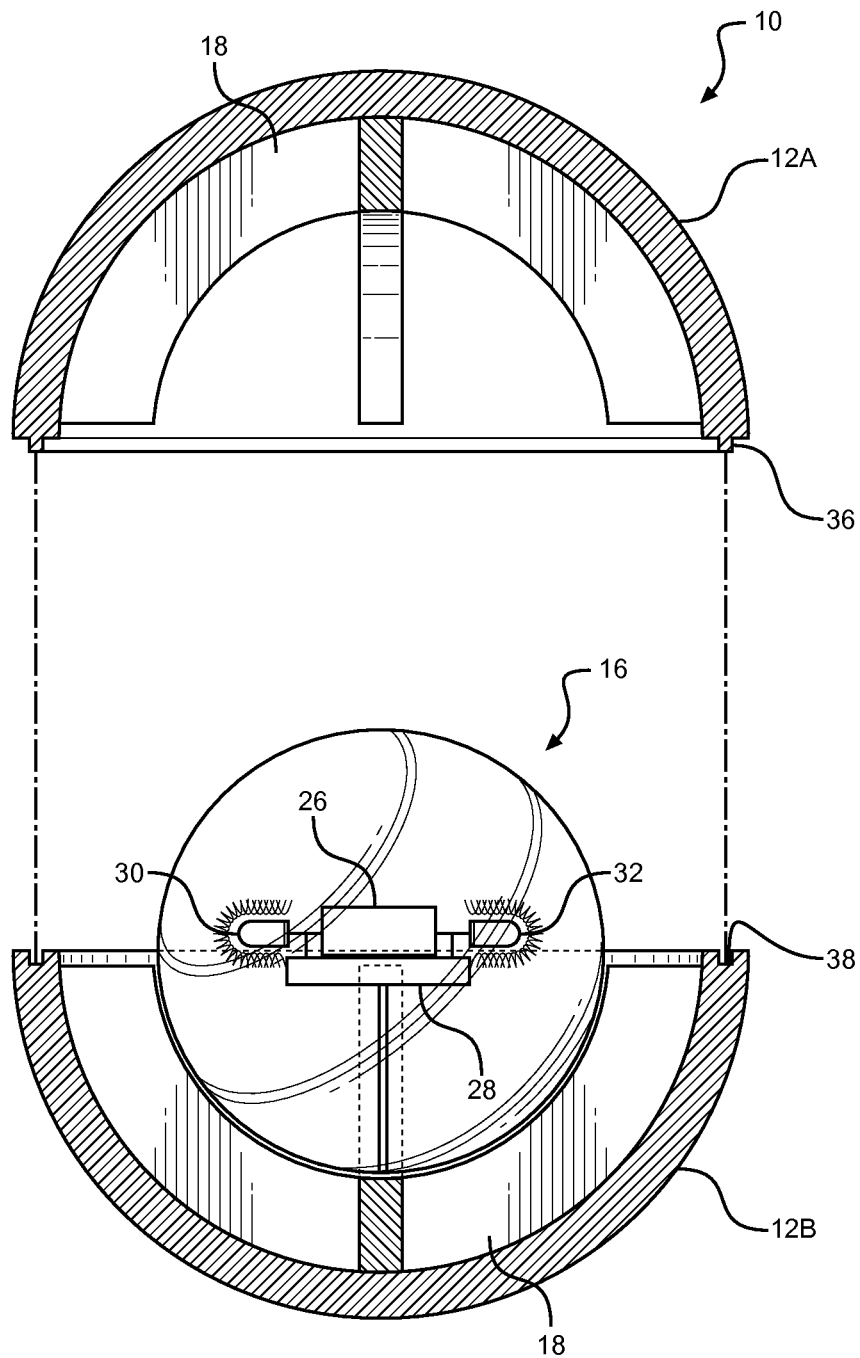
FIG. 2 is a partially exploded and sectioned view of the illuminated ball of FIG. 1.
Figure 3:
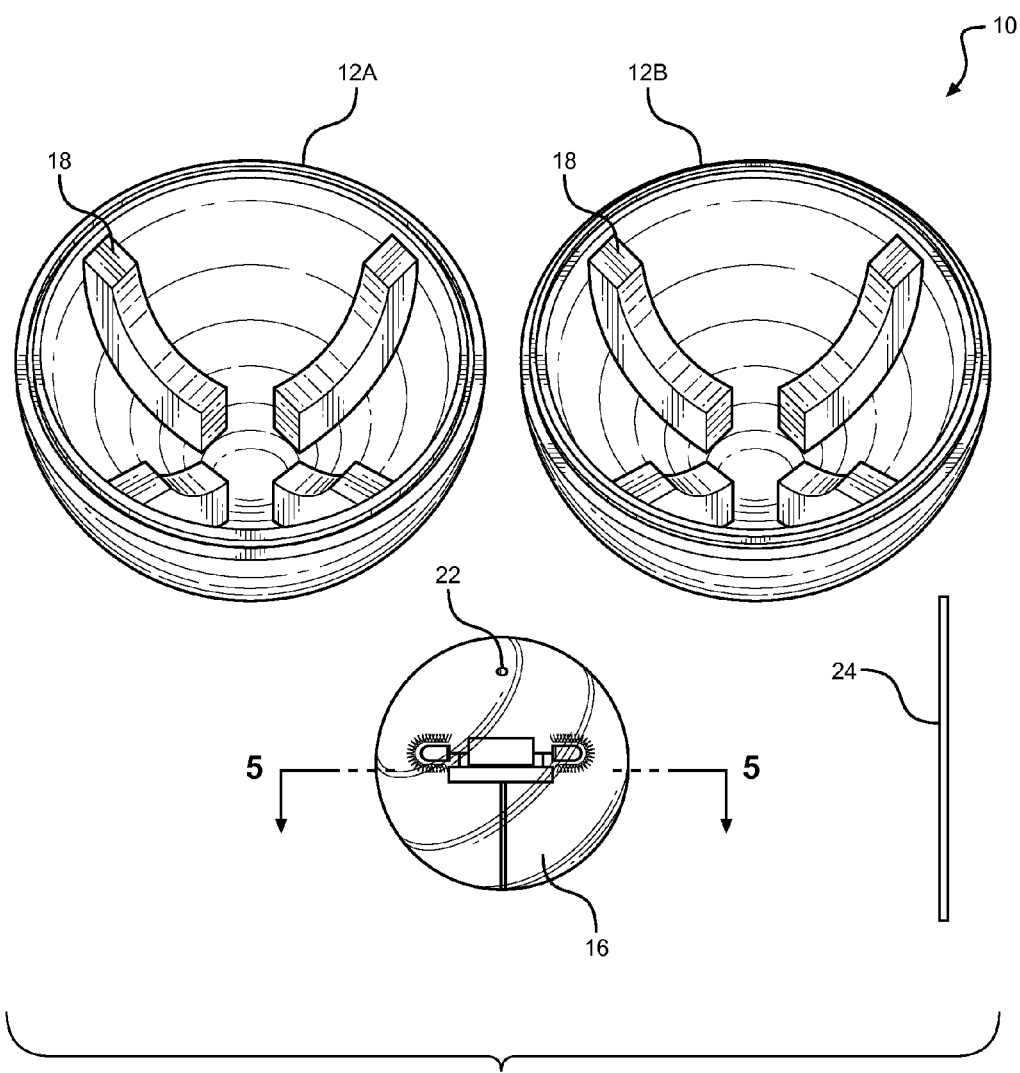
FIG. 3 is a perspective view of the illuminated ball of FIG. 1 with the first and second halves of the spherical outer shell separated and the light source removed therefrom.
Figure 4:
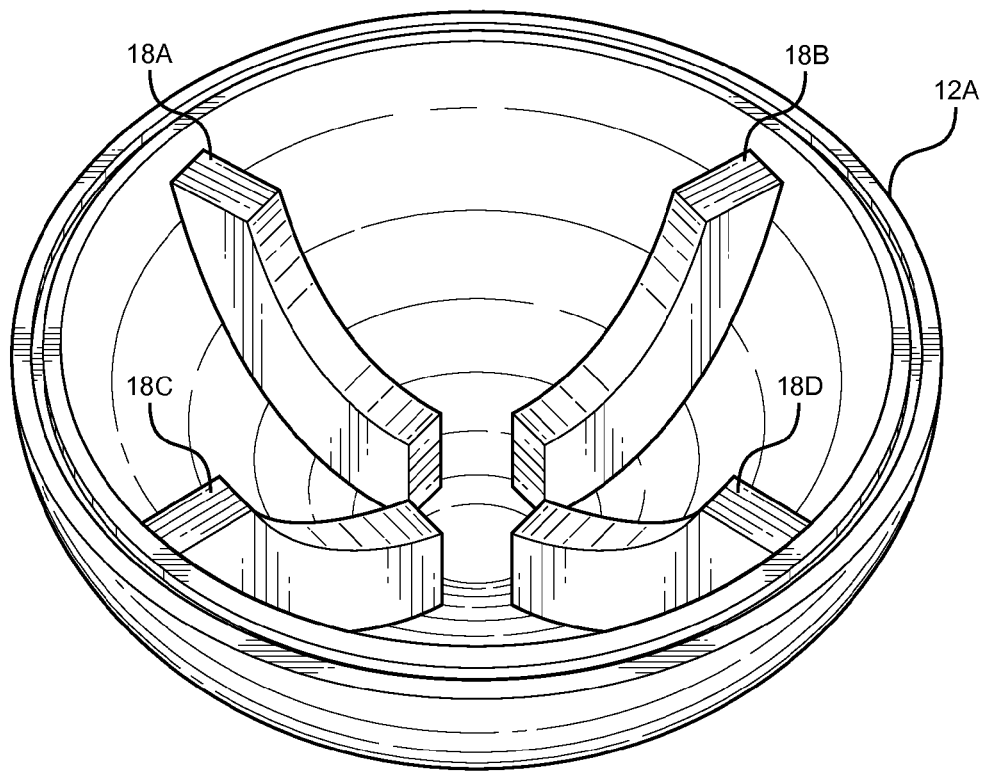
FIG. 4 is a perspective view of one half of the spherical outer shell.
Figure 5:
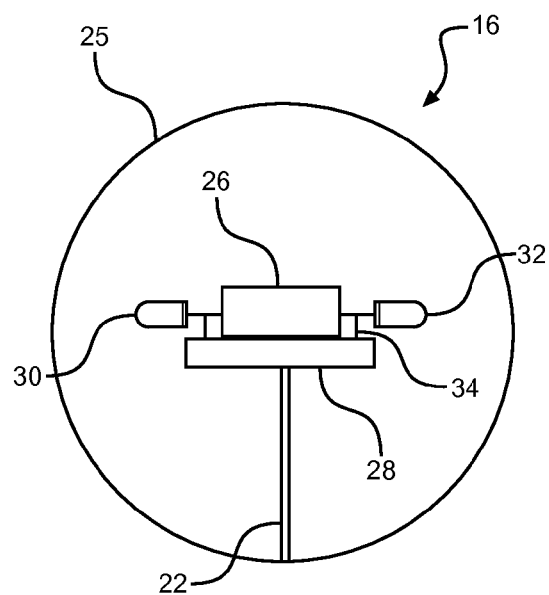
FIG. 5 is a cross-sectioned view of the light source of FIGS. 2 and 3 taken along the line 5-5 in FIG. 3.

With further reference to FIGS. 1 through 3, one can perceive that each hemispherical half 12A and 12B has a cradle structure 18. As shown in FIG. 4, the cradle structure in each half 12A and 12B can comprise first, second, third, and fourth raised walls 18A, 18B, 18C, and 18D disposed in an X-shaped configuration. The X-shape may or may not have a center portion where the walls 18A, 18B, 18C, and 18D meet. The walls 18A, 18B, 18C, and 18D of the cradle structures 18 of the first and second halves 12A and 12B can be disposed in alignment when the first and second halves 12A and 12B are joined. Each wall 18A, 18B, 18C, and 18D of the cradle structures 18 is of a consistent height approximately equal to one-half of the difference between the inner diameter of the outer sphere formed by the first and second halves 12A and 12B and the outer diameter of the inner, light source sphere 16. With that, the cradles 18 have inner surfaces along a spherical shape generally equal in diameter to the outer diameter of the inner sphere 16.

Under this construction, the inner, light source sphere 16 is securely retained in a concentric disposition relative to the outer sphere formed by the first and second halves 12A and 12B. Advantageously, the outer sphere and the ball 10 in general can be formed in a manner more efficient than the balls disclosed by the prior art. For example, the first and second halves 12A and 12B could be molded, such as from rubber or plastic, with the cradle structures 18 integrally molded therewith as a single piece. Alternatively, the cradle structures 18 could be formed, such as by molding, integrally with the inner sphere 16. In still another alternative, the cradle structures 18 could be formed as separate structures from the outer sphere 14 formed by the first and second halves 12A and 12B and the inner sphere 16.

It will be appreciated that, while the walls 18A, 18B, 18C, and 18D forming the cradles 18 are disposed in X-shaped configurations in this embodiment, it is possible within the scope of the invention except as it might be expressly limited for the walls 18A, 18B, 18C, and 18D to be disposed in alternative configurations. Some or all walls 18A, 18B, 18C, and 18D of the cradles 18 can be continuous or non-continuous. Preferably, the cradles 18 securely retain the inner, light source sphere 16 in a concentric disposition relative to the outer sphere 14 in a manner that resists dislodging even in response to impacts on the ball 10, such as where the ball 10 is struck by a game implement or shaken by an animal.

When assembled, the ball 10 retains the inner, light source sphere 16 in a concentric position relative to the outer sphere 14 formed by the first and second halves 12A and 12B. The light source sphere 16 and the ball 10 in general can become illuminated by any type of actuation, such as in response to an impact or other actuation. Where the light source 16 is actuated by impact, the impact activated switch 26 can permit power to flow from the battery 28 to the first and second LED's 30 and 32 through the electrical connections 34. The illumination could be constant, intermittent, or in some random or consistent pattern.

When necessary, the battery 28 can be recharged by an insertion of the electrically-conductive member 24 through the aperture 20 and the through-hole 22. The electrically-conductive probe member 24 would itself receive power from a power source, which could be a source of battery power, AC power, or some other power source. Alternatively, the battery 28 could be recharged by any other effective method, such as by wireless energy transfer through a power mat or the like.

Where the aperture 20 and the through-hole 22 are employed, they can additionally enable controlled access to a switching arrangement and components thereof from the exterior of the ball 10 by use of the elongate probe 24. The aperture 20 can incorporate a means for sealing the aperture 20 to prevent or minimize the entry of debris, liquids, and other materials. The means for sealing the aperture 20 could take any suitable form. In one embodiment, the means for sealing can simply be based on the construction of the aperture 20 itself in combination with the materials forming the core structure halves 12A and 12B. More particularly, the size and shape of at least a portion of the aperture 20 can be calibrated based on the resiliency of the surrounding material to result in an at least partial sealing off of at least part of the aperture 20 when the elongate probe 24 is not received therein. With this, the aperture 20 can be normally sealed and can be opened only by a sliding of the elongate probe 24 therethrough. Other sealing arrangements are, of course, possible and within the scope of the present invention except where it is expressly limited.

Game projectiles according to the invention can be particularly crafted for any use, whether as a street hockey ball, a jai alai ball, vented balls such as those commonly sold under the registered trademark WIFFLE® of The Wiffle Ball, Inc. of Shelton, Conn., a golf ball, a lacrosse ball, a baseball, a volleyball, a ping pong ball, a simply play ball, a hockey puck, a football, a soccer ball, a bocce ball, or any other game projectile. Alternatively, the game projectile could be constructed for use as a dog or cat ball or for substantially any other purpose.

In any event, when constructed as described herein, the ball 10 can withstand impacts and rugged use while maintaining the inner sphere 16 in a properly centered and balanced disposition. A further understanding of potential details and alternatives for the components of the ball 10 can be had by reference to the present inventor's U.S. Pat. No. 7,614,959 for a High Impact Game Ball Construction Method and Device, which is incorporated herein by reference.

Figure 6:
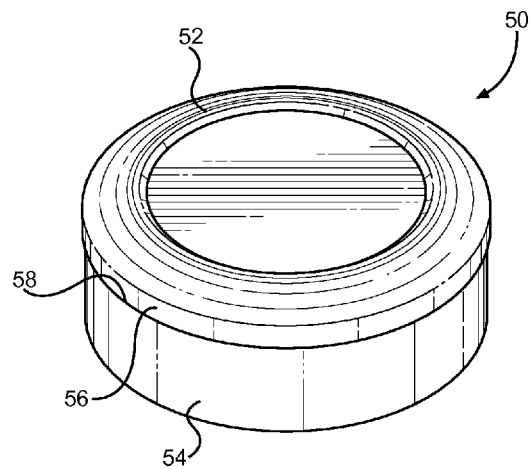
FIG. 6 is a perspective view of an alternative game projectile according to the invention.

An alternative game projectile according to the invention takes the form of a hockey puck in FIG. 6 where the hockey puck is indicated generally at 50. The hockey puck 50 could be a street hockey puck, an ice hockey puck, or some other type of puck, and it will be appreciated that the hockey puck 50 could incorporate further features within the scope of the invention. For example, the present inventor has further appreciated that it could be advantageous in particular embodiments to have a puck 50 with rounded upper and lower peripheral edges so that the peripheral wall of the puck 50 would have an arcuate configuration. Under such a construction, the puck 50 will tend to glide and travel over obstacles more easily.

In any case, the hockey puck 50 can be considered to have an upper portion 52 with an annular outer surface and a lower portion 54 with an annular outer surface. The upper and lower portions 52 and 54 are joined together in any suitable manner, whether by sonic welding, adhesive, mechanical fasteners, or any other method or combination thereof to define an inner volume. As seen perhaps most clearly in, for example, FIG. 7, the upper portion 52 can have an annular male ridge 56 for engaging a corresponding annular female channel 58 in the lower portion 54. With that, the upper and lower portions 52 and 54 can be connected to form a unitary puck construction for use as a game projectile during hockey play.

The hockey puck 50 has an upper retaining cup 60 fixed in a concentric position relative to the upper portion 52, and a lower retaining cup 62 is fixed in a concentric position relative to the lower portion 54. When the upper and lower portions 52 and 54 are joined as shown and described herein, the upper and lower retaining cups 60 and 62 define a light source retaining volume for receiving a light source 76 and retaining the light source 76 in a concentric position relative to the upper and lower portions 52 and 54 and the hockey puck 50 in general.

The upper and lower retaining cups 60 and 62 can be fixed and retained in a concentric position relative to the upper and lower portions 52 and 54 by any appropriate method. For example, the upper and lower retaining cups 60 and 62 could be fixed in place by adhesive, sonic welding, integral formation, mechanical fasteners, or any other method or combination thereof.

Figure 7:
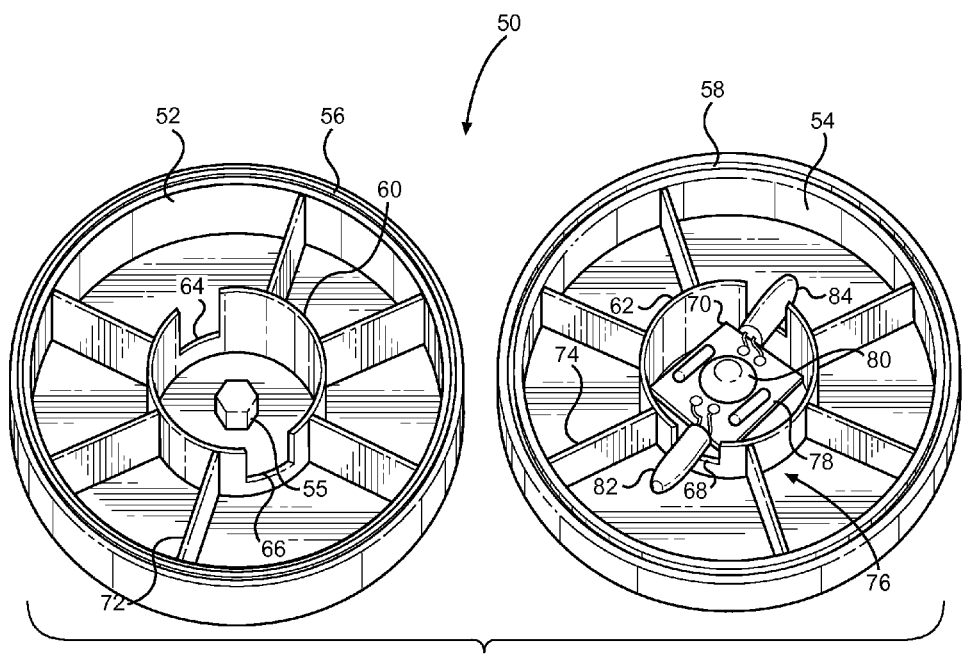
FIG. 7 is a perspective view of the game projectile of FIG. 6 separated into first and second portions.

In the embodiment of FIG. 7, the upper retaining cup 60 is additionally or alternatively retained in place by a plurality of upper cradling fins 72, and the lower retaining cup 62 is additionally or alternatively retained in place by a plurality of lower cradling fins 74. The upper and lower cradling fins 72 and 74 in this embodiment have outer ends in contact with the peripheral walls of the upper and lower portions 52 and 54, inner ends in contact with the peripheral walls of the upper and lower retaining cups 60 and 62, and body portions radially spanning therebetween. Here, there are six evenly spaced cradling fins 72 and 74 in each of the upper and lower portions 52 and 54. The cradling fins 72 and 74 can be integrally formed with the upper and lower portions 52 and 54 or fixed relative thereto by any effective method. The cradling fins 72 and 74 can be crafted from any suitably rigid material or combination thereof.

With the upper and lower retaining cups 60 and 62 thereby fixedly retained in a concentric position relative to the upper and lower portions 52 and 54, a light source 76 disposed within the open inner volume defined by the cups 60 and 62 will be fixed in a concentric position relative to the upper and lower portions 52 and 54. The light source 76 in the embodiment of FIG. 7 has a body portion that is founded on a circuit board 78, and first and second lights 82 and 84, in this case LED's, project in opposition outboard from the circuit board 78. A press switch 80 is fixed to the circuit board 78. The upper retaining cup 60 has first and second opposed openings 64 and 66 in the peripheral wall thereof, and the lower retaining cup 62 has first and second opposed openings 68 and 70 in the peripheral wall thereof. With this, the first and second lights 82 and 84 can project outboard of the upper and lower retaining cups 60 and 62 to emit light through the upper and lower portions 52 and 54.

The light source 76 advantageously can be activated by an impact on the hockey puck 50 where an impact switch is provided, and the light source 76 can alternatively be activated by a pressing on the press switch 80. Where the upper portion 52 has a degree of flexibility or where some other means is provided, the light source 76 can be activated simply pressing on a central area of the upper portion 52. An actuation button 55 can be interposed between the switch 80 and the upper portion 52 for ensuring a positive actuation of the switch 80 upon a pressing on a central area of the upper portion 52. The actuation button 55 can be fastened to or formed with the upper portion 52. Alternatively, it could be retained by the light source 76 or in some other manner.

Figure 8:
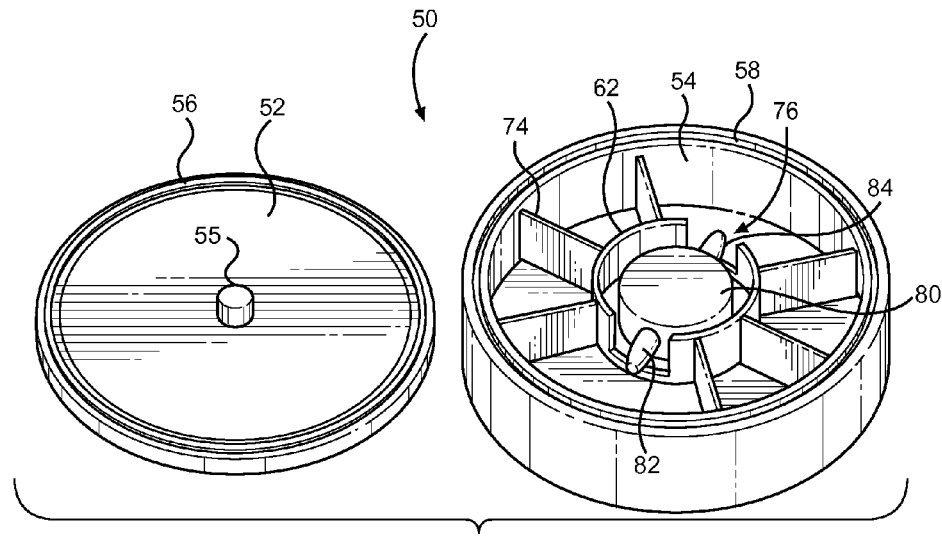
FIG. 8 is a perspective view of an alternative game projectile pursuant to the invention again separated into first and second portions.

As shown in FIG. 8, it would be possible within scope of the invention for the lower portion 54 to include the entire peripheral wall of the hockey puck 50 such that the upper portion 52 essentially forms a cap of the puck 50. Under this construction, only the lower retaining cup 62 is provided. Again, the retaining cup 62 has first and second opposed openings therein for receiving the lights 82 and 84 of the light source 76 therethrough. The retaining cup 62 is fixed in place as before by adhesive, integral formation, sonic welding, mechanical fasteners, or any other method or combination thereof. The retaining cup 62, and thus the light source 76, is further retained by a plurality of retaining fins 74 that again project radially from the retaining cup 62 with sufficient rigidity to restrain the retaining cup 62 against inadvertent movement.

Figure 9:
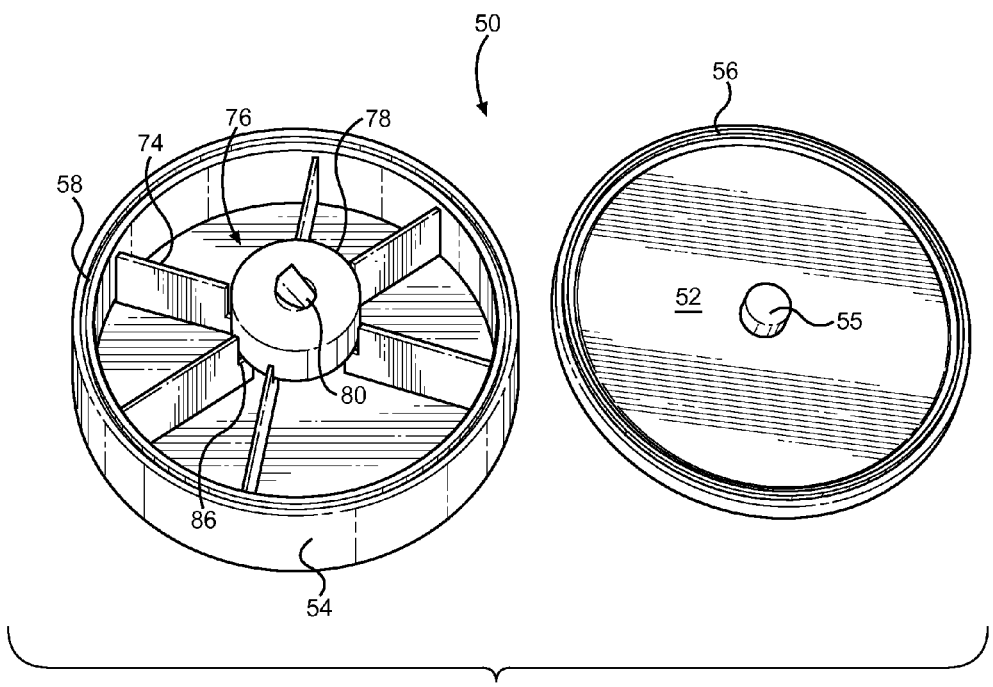
FIG. 9 is a perspective view of another game projectile pursuant to the invention again separated into first and second portions.
Figure 10:
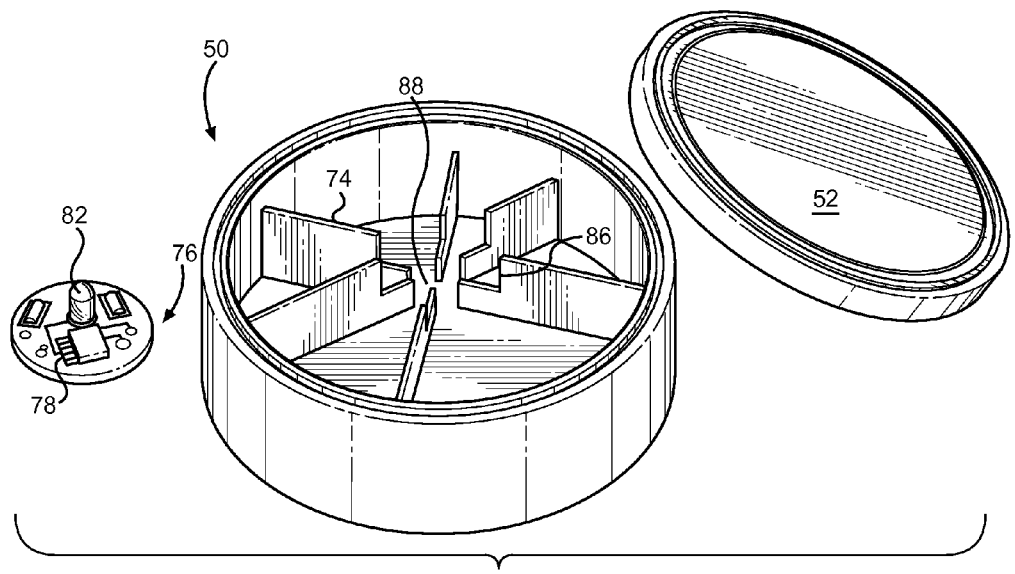
FIG. 10 is a perspective view of the game projectile of FIG. 9 with the light source separated therefrom.

In the alternative embodiment of FIGS. 9 and 10, the retaining cups 60 and 62 are foregone. Instead, the light source 76 is directly retained by the retaining fins 74. More particularly, each of the retaining fins 74 has a shoulder 86 formed at the inner end thereof such that the inner portion of each retaining fin 74 has a first upstanding portion, an inwardly communicating shoulder portion, and a second upstanding portion. The second upstanding portions at the inner ends of the retaining fins 74 terminate short of the center of the hockey puck 50 such that a light source receiving volume 88 is provided between the several retaining fins 74.

Under this construction, a light source 76 having an annular body portion founded on the circuit board 78 and a light 82 that projects concentrically from a first side of the light source 76 can be securely retained in a concentric position relative to the hockey puck 50. To do so, the body portion of the light source 76 can be rested on the shoulders 86 of the retaining fins 74, and the light 82 can be received in the light source receiving volume 88 formed between the inner ends of the retaining fins 74.

Figure 11:
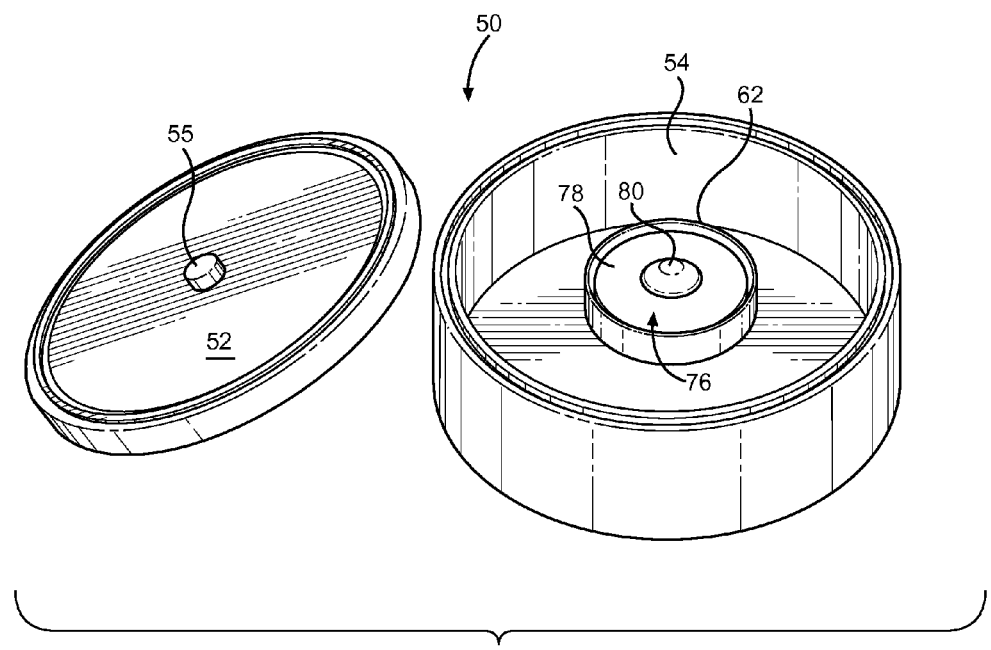
FIG. 11 is a perspective view of a further game projectile pursuant to the invention again separated into first and second portions.
Figure 12:
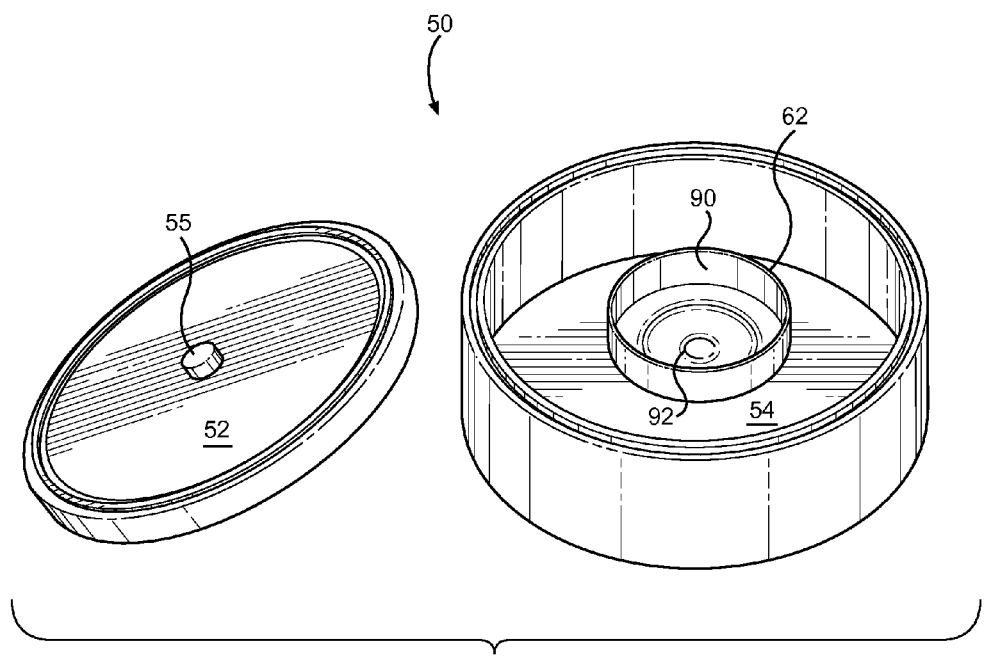
FIG. 12 is a perspective view of the game projectile of FIG. 11 with the light source removed therefrom.

In the embodiment of FIGS. 11 and 12, the light source 76 is again retained concentrically relative to the upper and lower portions 52 and 54 of the hockey puck 50. Here, however, the retaining fins 74 are removed, and the light source 76 is concentrically retained by a retaining cup 62 that is fixed in a concentric position relative to the lower portion 54 of the puck 50. As before, the retaining cup 62 can be secured relative to the lower portion 54 by any effective method. In the depicted embodiment, the retaining cup 62 has an open inner volume with a shoulder portion 90 for supporting the circuit board 78 and the body portion in general of the light source 76. A light source receiving volume 92 is concentrically disposed within the retaining cup 62 for receiving and protecting the light 82 of the light source 76. Again, the light source 76 can be activated by impact and, additionally or alternatively, by a press switch 80.

With a plurality of exemplary embodiments and details of the present invention for an illuminated game projectile with cradled light source disclosed, it will be appreciated by one skilled in the art that changes and additions could be made thereto without deviating from the spirit or scope of the invention. This is particularly true when one bears in mind that the presently preferred embodiments merely exemplify the broader invention revealed herein. Accordingly, it will be clear that those with certain major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, these claims shall be construed to cover not only the corresponding structure and material expressly described in this specification but also all equivalents thereof that might be now known or hereafter discovered.

I claim as deserving the protection of Letters Patent:

1. An illuminated game projectile with a cradled light source, the game projectile comprising:
   an outer shell with an outer surface, an inner surface, and an open inner volume wherein the outer shell has a hockey puck disk shape with an annular outer peripheral wall and first and second faces retained in spaced relation by the peripheral wall;
   a light source structure disposed within the open inner volume of the outer shell, the light source structure comprising a light source, a power source, and an actuation mechanism; and
   a cradle structure disposed within the open inner volume of the outer shell to retain the inner light source structure in a predetermined position within the outer shell wherein the cradle structure has an outer portion that engages the outer shell and an inner portion that engages and retains the light source structure and wherein the cradle structure comprises a plurality of radially communicating cradling fins with distal ends adjacent to the peripheral wall and proximal portions that retain the inner light source structure.

2. The game projectile of claim 1 wherein the cradle structure retains the light source structure spaced from the inner surface of the outer shell.

3. The game projectile of claim 1 wherein the actuation mechanism comprises an impact activated switch.

4. The game projectile of claim 1 wherein the power source is rechargeable.

5. The game projectile of claim 4 wherein the power source is wirelessly rechargeable.

6. The game projectile of claim 1 wherein the cradle structure comprises a wall structure interposed between the inner surface of the outer shell and the outer surface of the light source structure.

7. The game projectile of claim 6 wherein the walls of the cradle structure cooperate to encircle the light source structure substantially entirely.

8. The game projectile of claim 1 wherein each of the cradling fins has a shoulder formed at the inner end thereof such that the proximal portion of each retaining fin has a first, outer upstanding portion, a radially communicating shoulder portion, and a second, inner upstanding portion wherein the second upstanding portions at the proximal ends of the cradling fins terminate short of a center of the outer shell such that a light source receiving volume is provided between the proximal ends of the several retaining fins.

9. The game projectile of claim 1 wherein the actuation mechanism of the light source structure comprises a press switch operable by pressing on one of the faces of the outer shell.

10. The game projectile of claim 1 wherein the cradle structure comprises a retaining cup fixed between the first and second faces of the hockey puck disk shape wherein a light source receiving volume is disposed within the retaining cup and wherein the light source structure is received within the light source receiving volume.

\* \* \* \* \*